(12) United States Patent
Weinstein

(10) Patent No.: US 8,016,005 B1
(45) Date of Patent: Sep. 13, 2011

(54) COMBINATION MORTISE AND TENON JIG

(75) Inventor: Burton Weinstein, New York, NY (US)

(73) Assignee: General Tools & Instruments Company LLC, New York, NY (US)

( * ) Notice: Subject to any disclaimer, the term of this patent is extended or adjusted under 35 U.S.C. 154(b) by 0 days.

(21) Appl. No.: 12/720,809

(22) Filed: Mar. 10, 2010

(51) Int. Cl.
*B27C 5/00* (2006.01)

(52) U.S. Cl. .............................. 144/144.51; 144/144.1

(58) Field of Classification Search ............... 144/27, 144/84, 144.1, 144.51, 145.1, 372, 144.52; 33/197; 409/125, 130
See application file for complete search history.

(56) References Cited

U.S. PATENT DOCUMENTS

| | | | | |
|---|---|---|---|---|
| 2,605,791 A | * | 8/1952 | Zern | 144/27 |
| 4,306,823 A | * | 12/1981 | Nashlund | 408/26 |
| 4,428,408 A | * | 1/1984 | Grisley | 144/144.51 |
| 4,445,277 A | * | 5/1984 | Keefe | 33/197 |
| 4,586,262 A | * | 5/1986 | Back | 33/197 |
| 4,787,432 A | | 11/1988 | Williams | |
| 4,815,215 A | * | 3/1989 | Saylor et al. | 33/197 |
| 5,067,537 A | * | 11/1991 | Offner | 144/372 |
| 5,123,463 A | | 6/1992 | Grisley | |
| 5,146,961 A | * | 9/1992 | Schoeller | 144/3.1 |
| 5,458,171 A | * | 10/1995 | Ward | 144/84 |
| 5,492,160 A | * | 2/1996 | McCracken | 144/367 |
| 5,494,089 A | * | 2/1996 | Lubbe | 144/144.1 |
| 5,832,977 A | * | 11/1998 | Hampton | 144/144.1 |
| 6,039,095 A | * | 3/2000 | Newman | 144/144.52 |
| 6,076,575 A | * | 6/2000 | Harkness | 144/144.1 |
| 6,112,783 A | * | 9/2000 | Newman | 144/144.52 |
| 6,138,726 A | * | 10/2000 | Newman | 144/371 |
| 7,497,238 B2 | * | 3/2009 | Williams | 144/144.52 |
| 2008/0210338 A1 | * | 9/2008 | Ponce | 144/144.51 |
| 2008/0251154 A1 | | 10/2008 | Gill | |

* cited by examiner

*Primary Examiner* — David J. Walczak
*Assistant Examiner* — Jennifer C Chiang
(74) *Attorney, Agent, or Firm* — Gordon D. Coplein

(57) ABSTRACT

A combination mortise and tenon jig has a body including a platform having an open section with first and second clamp legs on opposite sides for holding a workpiece therebetween with the workpiece part in which a mortise or tenon is to be cut facing toward the open section. A plurality of adjustable members extend from the first clamp leg to engage a workpiece face and the second clamp leg is movable relative to the open section with the extending members and the second clamp leg holding the workpiece at a selected position in the open section. A pair of guide arms pivotally mounted below the platform swing across the platform open section to engage the workpiece part and make it parallel to the platform and a template having a cutout pattern of one of a mortise or tenon overlies the platform open section to guide a router bit to cut the mortise or tenon in the workpiece end.

18 Claims, 3 Drawing Sheets

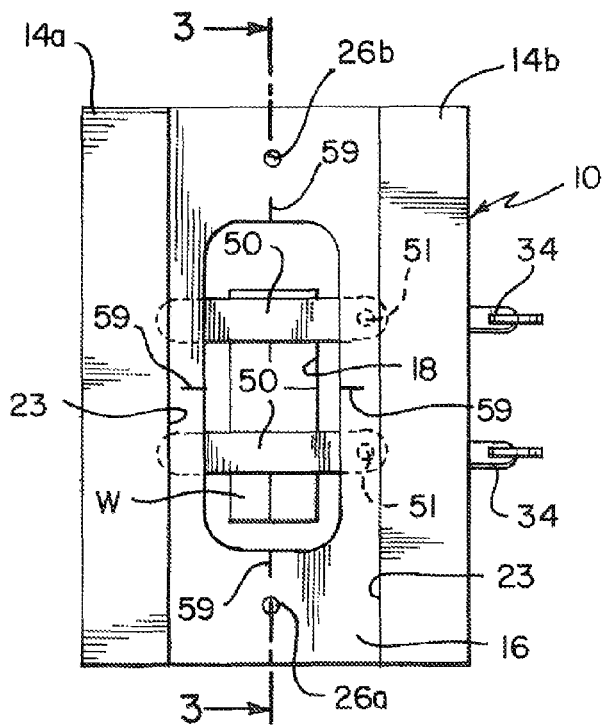
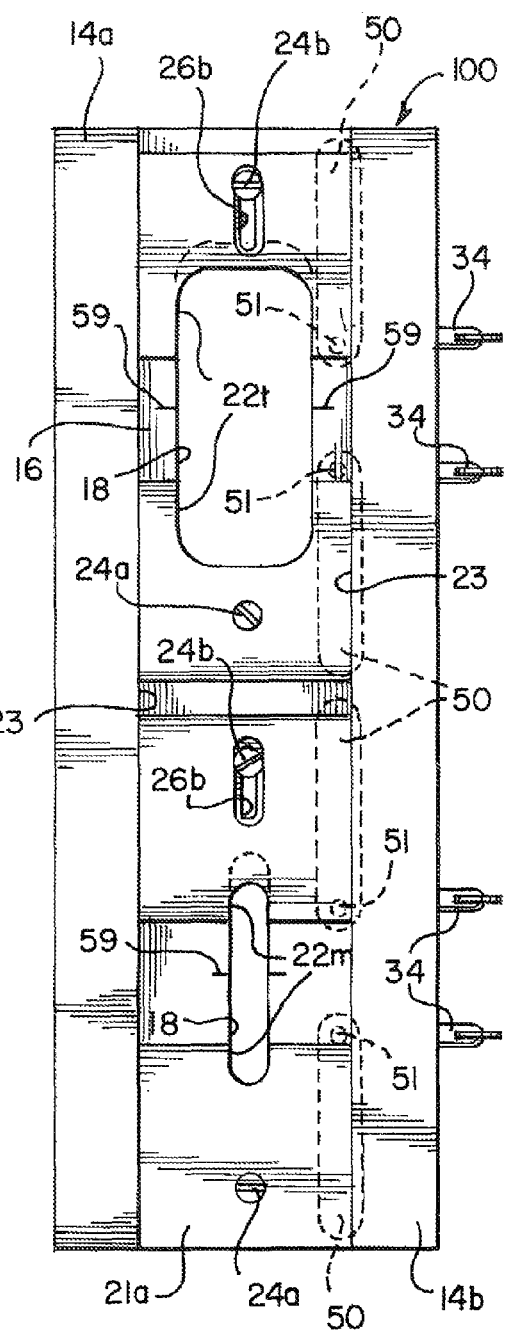
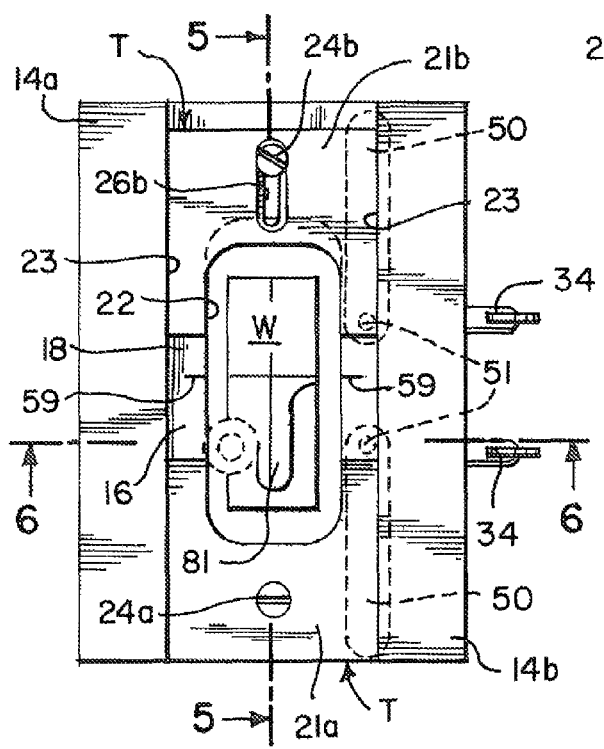

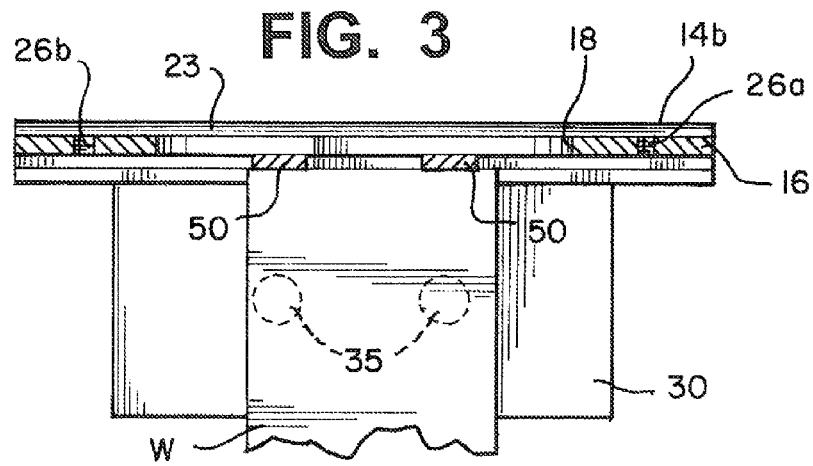
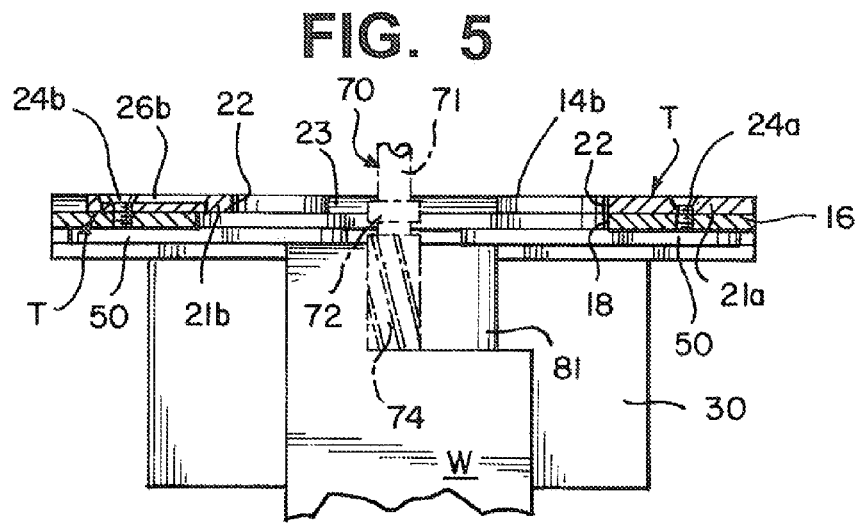
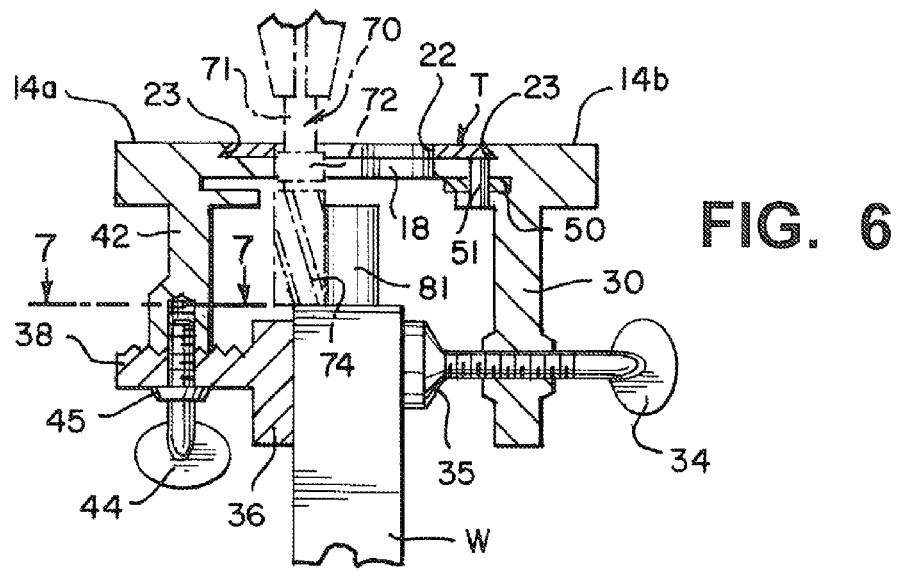

COMBINATION MORTISE AND TENON JIG

FIELD OF THE INVENTION

The present invention is for a jig to produce both the mortise and the tenon parts of a mortise and tenon joint.

BACKGROUND OF THE INVENTION

A mortise and tenon joint provides one of the oldest and most useful ways of joining two or more wood pieces in the making of furniture and other wood products. This joint is of two parts. The first part is the "mortise" which is a cavity cut into one wood workpiece. The mortise is of a size and shape to accept the joining "tenon" part, which is a mating projection cut into the end of a second workpiece.

Various types of machines exist to make mortise and tenon joints on a production basis. However, a hobbyist or craftsman of a small woodworking shop has no ready access to such machines which can be relatively expensive. The typical method of making a mortise and tenon joint by hobbyists and craftsmen involves several separate operations and a number of different tools. Making the mortise involves measuring, layout, drilling, and chiseling to form the cavity. Measuring, layout, cutting, counter-sawing, and other operations are required to make the mating tenon. Accordingly, a need exists to provide the hobbyist and craftsman with a device that is inexpensive and that greatly simplifies making a mortise and tenon joint.

BRIEF DESCRIPTION OF THE INVENTION

The present invention is a jig that enables the hobbyist and craftsman to quickly and relatively easily make the parts for a mortise and tenon joint with a router without the need to go through most of the previously described measuring, chiseling and sawing operations. The invention provides for accurately making both the mortise and tenon parts of the joint using the same jig.

In accordance with the invention, the jig has a main body with side rails between which there is an upper platform having an open section. A template for a router having router guide patterns of one or both of the mortise and tenon joint parts rests on the platform. The base of a router rides on the upper surfaces of the jig and the template router guide pattern overlies the platform open section to accept the router bit as it cuts into a workpiece.

The part of the workpiece in which the mortise or tenon is to be made is placed against a pair of swing guide arms moving from one of the jig body rails below the platform to lie across its open section. The guide arms are parallel to the jig body rails and template upper surfaces so that engagement of the workpiece with the guide arms makes the engaged workpiece part parallel to the jig body rails and template upper surfaces. The arms are retracted from being across the open central area before the router bit is operated.

One face of the workpiece opposes a fixed clamp leg that extends downwardly from one rail of the jig main body. A plurality of adjustable thumbscrews extend through this clamp leg and have padded ends to engage a workpiece opposing face. A second clamp leg is below the other jig body rail and is adjustably attached to this rail to be movable toward or away from the other workpiece face while still being parallel to it. The workpiece is held between the two clamp legs. Its part in which the mortise or tenon is to be cut by the router bit is centered along the platform open section longitudinal axis by adjustment of the first leg thumbscrews and the second clamp leg. A line can be drawn lengthwise along the middle of the workpiece part to register with at least one mark on the platform or template center for centering the workpiece in the platform open section along its longitudinal axis.

A router guide template that has a cutout pattern for the mortise or tenon part to be cut is placed on the platform with the pattern overlying the platform open section. The guide template preferably is made of two pieces with at least one of them being movable along the length of the platform to set the length of the pattern cutout thereby allowing mortises and tenons of different lengths to be made. The center of a mortise or tenon part along its length in the workpiece can be set by eye. But it is preferred that this be more accurately accomplished by making a line transverse across the workpiece that will be registered with a mark on the jig body platform or template to set the center point of the length of the mortise or tenon part.

The cutter bit of a plunge type router is inserted through the template guide pattern opening into the workpiece and the router is guided by a router guide sleeve or rotatable bearing on the router bit shank that rides against and along the template pattern cutout guide edge as the router is moved to cut the mortise or tenon part in accordance with the template cutout pattern being used.

BRIEF DESCRIPTION OF THE DRAWINGS

Other objects and advantages of the present invention will become more apparent upon reference to the following specification and annexed drawings in which:

FIG. 2 is the top plan view of the jig showing the swing arms engaging the top part of the workpiece;

FIG. 3 is a side elevational view in cross-section along the lines 3-3 of FIG. 2;

FIG. 4 is a top view of the jig with the swing arms retracted and a router bit cutting a tenon;

FIG. 5 is an elevational view along the length of the jig and workpiece in cross-section along lines 5-5 of FIG. 5;

FIG. 6 is an elevational view of the jig transverse to FIG. 6 along lines 6-6 of FIG. 4;

FIG. 8 is a top plan view of an alternate embodiment of the invention.

DETAILED DESCRIPTION OF THE INVENTION

Figure 1:
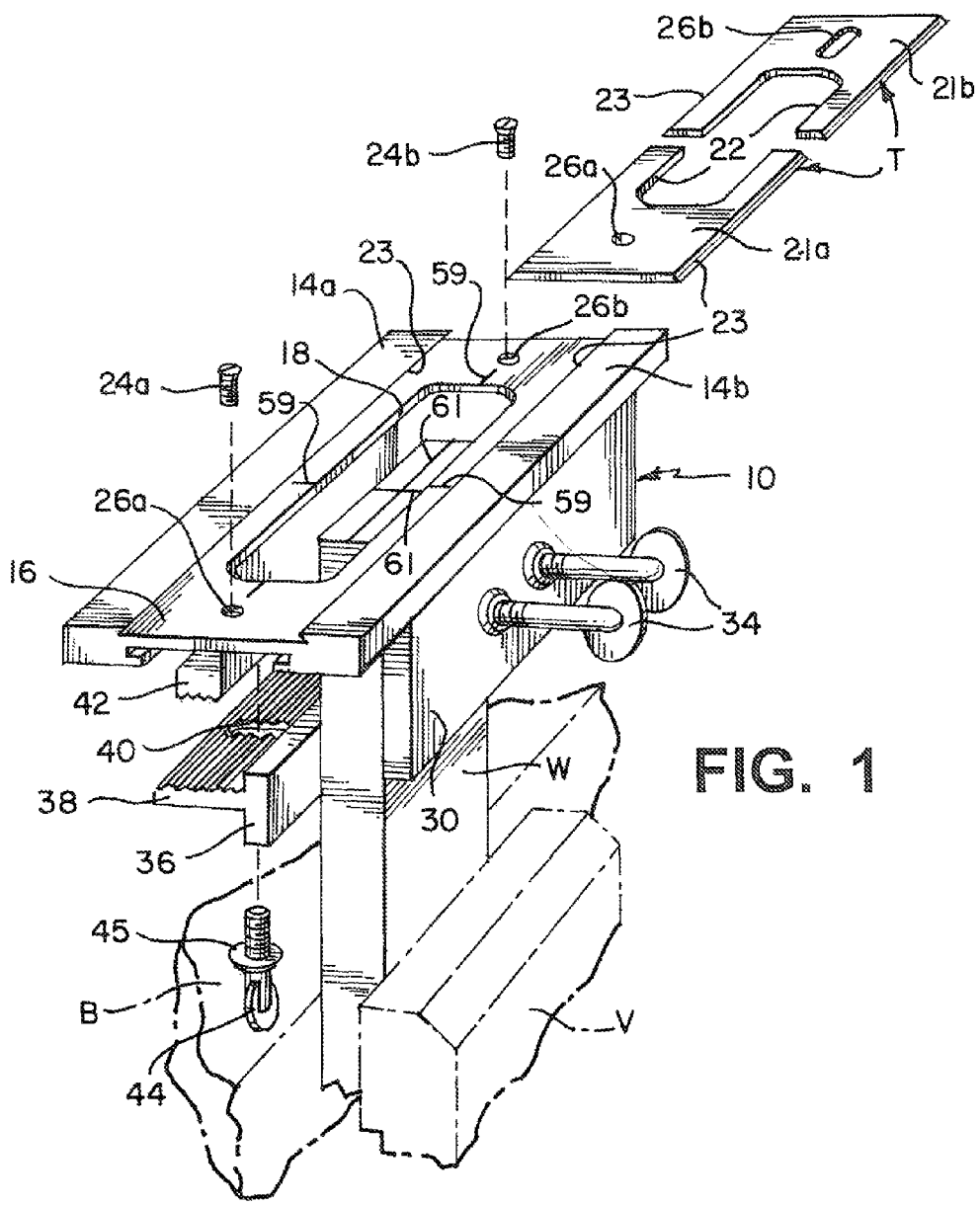
FIG. 1 shows an end perspective view of the jig body mounted on a workpiece clamped in a bench vise together with the router template.

Referring to FIG. 1, there is a workpiece W in which a mortise or tenon is to be made. In the illustrative example of use of the invention being described, the mortise or tenon is to be cut in the workpiece end. Therefore, the workpiece is vertical with its broad faces across its width below the end held between the inner face of a bench vise V and the edge of a workbench B. The mortise also could be made on a side edge of the workpiece anywhere along its length in which case the workpiece would be held in a horizontal position. A tenon also could be made on the side edge, but it would not be usual. As used in the specification and claims, the terms workpiece "end" or "part" where the mortise and tenon parts are made apply to both vertical and horizontal positioning of the workpiece for making the parts either on the workpiece end or side edge.

A jig 10 has a body of an upper top part of two outer rails 14a and 14b with flat upper surfaces. Between the rails there is a depressed template holding platform 16 that has an open section 18 which is generally rectangular having width and length dimensions and is elongated along the jig body longitudinal axis. The open section longitudinal axis is parallel to the rails. The main body of the jig preferably is an aluminum extrusion. Other forms of conventional fabrication may be used for the main body and other parts of the jig within keeping of the aims and functions of the invention described herein.

A router guide template T with a cut out pattern 22 for either a mortise or a tenon is to be placed and held on the jig platform 16 between its raised side walls with the pattern cutout 22 being over the jig platform open section 18. There usually is a separate template for each of the mortise and tenon parts for use with the jig body of FIG. 1 and these are switched when the different joint parts are being made. The edges 23 of the template and rails can have mating dovetails so that the template, or template parts, will slide in the dovetails and be positively fixed on the platform Preferably, the thickness of the template T makes its top surface flush with the rail 14a and 14b top surfaces. The base of a router (not shown) is to move on the rail and template top surfaces. If the template T is large enough the router can ride on only its surface so that it can extend above the rail top surfaces.

The template T can be of a single piece in which case the length of each of a mortise and tenon is fixed. The length and width of the mortises and tenons may be varied by using different templates or router guide sleeves. In a preferred embodiment of the invention, the template is made of two pieces 21a and 21b that together define the pattern cutout 22. Piece 21a is fixedly held on the platform 16 by a screw 24a passing through a hole 26a to be threaded into a hole 26a in the jig platform 16. The other template piece 21b is held on the platform 16 by a screw 24b passing through an elongated slot 26b into a threaded hole 26b in the platform. The slot 26b of template piece 21b permits the piece 21b to be moved lengthwise on the platform 16 and thereby set the length of the mortise or tenon. The screws 24 are countersunk into the template so that they do not interfere with the router base that will ride over them.

In an alternative embodiment for mounting the template the hole 26a and screw 24a for the piece 21 can be replaced by a peg on the bottom of the piece that fits into a hole in the platform. The screw 24b can be replaced by a peg extending upwardly from the platform into the slot 26b of piece 21b. Here, the peg and slot side walls preferably would have an interference fit or mating hills and grooves to hold piece 21b fixed on the platform. Also, the dovetail 23 would not be used because the template piece with a peg has to be laid on the platform.

A jig first clamp leg 30 extends transversely downwardly from rail 14b along its length. The jig body extrusion of the rails and platform can include this leg 30. The first clamp leg is about equal to or somewhat less in length than the length of the rails 14. A pair of spaced thumbscrews 34 are threaded through leg 30. There are flat pads 35 (see FIG. 6) at the ends of the thumbscrews 34 that engage a workpiece face.

Figure 7:
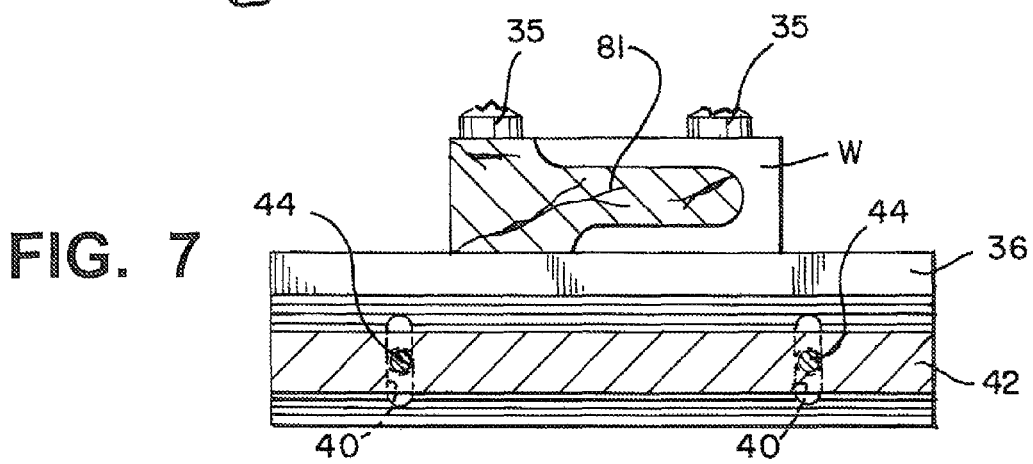
FIG. 7 is a top view in cross-section along lines 7-7 of FIG. 6 showing the jig second clamp leg.

A second clamp leg 36 (also see FIG. 7) is below and parallel to the rail 14a along its length and is to engage the workpiece opposite face. Clamp leg 36 has a ledge 38 along its length that extends transversely to it and the ledge is parallel to rail 14a and the platform 16. Clamp leg ledge 38 has longitudinal crenelation, or serrations, on its upper surface with a slot 40 near one end that is transverse to the ledge length. The ledge 38 also has a similar slot 40 near its other end. An elongated linear runner 42 extends along the lower surface of the jig rail 14a and is parallel to it. The runner 42 also can be extruded as part of the jig body. Runner 42 has longitudinal crenelation, or serrations, on its lower surface opposing the ledge 38. The crenelations of the ledge 38 and the runner 42 mate and keep the workpiece engaging face of the second clamp leg 36 parallel to the inner face of the first clamp leg 30. The second clamp leg 36 is adjustably attached to the rail 14a by a thumbscrew 44 that passes through the ledge 38 slot 40 at each end of the ledge into a corresponding threaded hole (not shown) in the runner 42. A washer 45 on screw 44 engages the lower face of the ledge 38. Adjustment of the screws 34 of the first clamp leg and the position of the second clamp leg holds the workpiece at an adjustable position relative to the longitudinal center of the width of the platform open section 18.

Referring to FIGS. 2-4, two swing guide arms 50 are each mounted on a pivot 51 under the platform 16 adjacent to the jig body rail 14b. The arms 50 are long enough to extend across the platform open section 18 (see FIGS. 2 and 3). The purpose of the swing guide arms is to make the workpiece part in which the tenon or mortise is to be cut parallel to the top surfaces of the jig body rails and the template. This ensures that the tenon or mortise will be perpendicular to the workpiece edge and aligned along its length. The arms 50 are retracted to lie along rail 14b when the router is being used to cut the tenon or mortise (see FIGS. 2 and 5-6). If desired, the free ends of the arms 50 can be extended with handles and configured so that the handles pass under rail 14a or through the rail to be more easily accessible from outside of the jig body.

Preferably, to aid in properly centering the workpiece in the platform open section 18 registration marks 59 are made at the center of each of the section 18 length and width. There also can be registration marks at the center of the width of a template pattern cutout.

The jig is used in the following manner. A workpiece is selected and if the tenon or mortise is to be cut in its end, then the end is "squared" (made perpendicular) to the workpiece length). Preferably, intersecting (transverse) registration lines, 61 in FIG. 1, are drawn across the middle of the width and thickness of the workpiece end. The workpiece W is clamped to the bench edge B by the vise V. The guide arms 50 are moved out across the platform open section 18 and the jig body is placed over the workpiece end so that the arms 50 rest on it. The jig body is moved lengthwise so that the platform open section width registration mark 59 aligns with the thickness cross-line 61 on the workpiece part. This centers the joint part to be cut along its length. The thumbscrews 34 of the first clamp leg 30 and the mating crenelation of the second clamp leg ledge 38 and the runner 42 are adjusted so that the first clamp leg thumbscrew pads 35 and the second clamp leg 36 hold workpiece with the registration line 61 along its length aligned with the open section length registration marks 59 on the jig body platform. This centers the workpiece in the platform opening so that the mortise or tenon part will be centered on the workpiece end or edge width. While the jig-workpiece alignment can be performed by eye, use of the registration lines and marks 59, 61 is preferred.

When the workpiece is correctly positioned and centered in the platform open sections the clamp screws 34 and 44 are fully tightened to secure the jig to the workpiece. The swing guide arms 50 are then swung back to their stored position (FIG. 4). The template pieces 21a and 21b are placed on the platform 16 and the desired length of the tenon or mortise is set by selecting the fastening point of the template piece 21b using the slot 26b.

A plunge type router (not shown) is used having a bit 70 with a shank 71 fastened in the router chuck. The bit has a cutter 74 and a router guide sleeve or guide bearing 72 above it that moves along the edge of the template T pattern cutout 22. The template pattern cutout 22 for a tenon preferably has the same width as the platform open section 18 so that the router bit guide sleeve or bearing will ride against both the walls of the cutout pattern and the platform open section as shown in FIGS. 5 and 6. A typical router bit 70 for cutting the tenon would have ½" O.D. router guide sleeve or guide bearing 72, a ¼" shank 71, and straight cutter 74 of appropriate diameter and 1" long or other appropriate cutting length.

Referring to FIGS. 4-6, the cutting of a tenon 81 is started by placing the base of the router on the top surface of the jig body, making sure the cutter bit guide bearing or sleeve 72 will extend into the template against the guiding edge of the pattern cutout 22 and the cutter 74 is of an appropriate depth to initiate cutting of the workpiece. Those skilled in the woodworking art will understand that the depth of the initial and incremental plunge of the route bit will depend on the hardness or softness of the wood workpiece.

To cut the mortise the appropriate template pieces are paced on the jig platform 16 and the steps described above are performed. A difference in cutting the mortise usually will be the mounting of the workpiece which will be horizontally arrayed, parallel to the axis of the jig but still be still squared against the swing guide arms 50 in the set-up position as described above. That is, the long edge of the workpiece corresponds to the workpiece end as shown in the drawing figures. Here, the transverse workpiece markings 61 would cross at the mortise center point. The router is used as described above. As seen in FIG. 8, the width of the template pattern cutout 22m for a mortise is less than that for a tenon 22t. Therefore, the router bit sleeve or bearing will ride against only the wall of the template pattern cutout. Any combination of router cutting bit, guide sleeve or bearing appropriate to the size and depth of the mortise or tenon desired and within the limits of the jig platform and template openings may be used.

In a further embodiment of the jig as shown in FIG. 8, the jig body 100 may be made long enough to accept both mortise and tenon cutting guide templates 22m and 22t arrayed in tandem. With reference to FIG. 8, a one piece template may be used having the cutout patterns for both the mortise and the tenon parts. Preferably, as shown, the template is of four pieces so that the lengths of both the mortise and tenon can be independently set. Here, the end piece 21a of the mortise template 22m is fixed and the other piece movable while the tenon template 22t has its end piece movable and its other piece fixed. Alternatively, the template can be of three pieces with a middle piece having a part of each of a mortise and tenon pattern and a fastening point at 26 of FIG. 1. The two end pieces would be the completion of the corresponding mortise and tenon template pattern. Each of the two end pieces would have a slot 26b to preserve the length adjustability for each of the patterns. The jig 100 of FIG. 8 preferably has separate first and second clamp legs. This enables two workpieces to be held at the same time or one workpiece in which both a mortise and a tenon part is to be made. The jig of FIG. 8 enables the craftsman to rout both parts of the mortise and tenon joint with one mounting.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A combination mortise and tenon jig for use in cutting one of a mortise or tenon in a part of a workpiece comprising:
   a body including a platform having an elongated open section with length and width dimensions;
   a template on said platform having a cutout pattern with edges defining a length and width of one of a mortise or tenon overlying the platform open section to guide a router bit to cut the mortise or tenon in the workpiece part;
   a first clamp leg fixedly mounted to said body below said platform on one side of said open section along its length;
   at least one member adjustably mounted to said first clamp leg to move either toward or away from said body open section and having a face to engage a first face of the workpiece; and
   a second clamp leg comprising a first part of an elongated member fixedly mounted to said body below said platform on the other side of said open section along the length of said body open section, and a second part having a ledge below said first part adjustably mounted to a face of said first part to move transversely relative to the length edges of said template and the length of said first part and an elongated face to engage a workpiece second face opposite the workpiece first face, said second clamp leg second part ledge and said face of said first part on which said second part is mounted each having serrations along their respective lengths that mate with each other to adjustably mount said second part to said first part so that said face of said at least one first clamp leg adjustable member and said face of said second clamp leg second part elongated face hold a workpiece there between with the part of the workpiece in which a mortise or tenon is to be cut facing toward said platform open section.

2. The combination mortise and tenon jig as claimed in claim 1 wherein there are a plurality of said adjustable members extending through said first clamp leg each having a part to engage the first face of the workpiece.

3. The combination mortise and tenon jig as claimed in claim 2 wherein adjustment of at least one of said adjustable members and second clamp leg second part positions the workpiece part relative to the width of said platform open section.

4. The combination mortise and tenon jig as claimed in claim 2 wherein said first clamp leg adjustable members comprise thumbscrews each having a part at the end to engage the workpiece first face.

5. The combination mortise and tenon jig as claimed in claim 2 further comprising a pair of arms pivotally mounted to said body below said platform along the length of said open section to be positioned across the width of said platform open section and to be engaged by the workpiece part.

6. The combination mortise and tenon jig as claimed in claim 1 wherein said ledge has through slots transverse to its length spaced apart, and further comprising a fastener passing through each said slot into said second clamp leg first part member to fasten said second clamp leg movable second part to said first part member.

7. The combination mortise and tenon jig as claimed in claim 1 further comprising a pair of arms pivotally mounted to said body below said platform along the length of said open section to be positioned across the width of said platform open section and to be engaged by the workpiece part.

8. The combination mortise and tenon jig as claimed in claim 1 wherein said template is of two pieces and one of said pieces can be selectively positioned on said platform relative to the other of said pieces to adjust the length of the mortise or tenon.

9. The combination mortise and tenon jig as claimed in claim 1 further comprising registration marks on said platform at the center of at least one of the length and width of said open section.

10. The combination mortise and tenon jig as claimed in claim 1 wherein said jig body, first clamp leg and said second clamp leg first part comprise a unitary extrusion.

11. The combination mortise and tenon jig as claimed in claim 1 wherein the serrations on the face of said second clamp leg first part member face and on said ledge are parallel to a length edge of said template.

12. A combination mortise and tenon jig comprising:
a body including a platform having an open section with length and width dimensions;
a first and a second clamp leg mounted to said body below said platform with one said clamp leg on each side of said open section along its length and with said second clamp leg being adjustably mounted to said body to move relative to the width of said open section, said first and second clamp legs for holding a workpiece there between with the part of the workpiece in which a mortise or tenon is to be cut facing toward said open section, wherein said second clamp leg comprises a first part member fixedly mounted to said jig body below said platform along the length of one side of said open section, and a movable part that is adjustably mounted to be positioned transverse to the length of said first part member and having a face that is to engage the workpiece, wherein said second clamp leg movable part has a ledge that is below said first part member, and said first part member and ledge each has serrations along the respective lengths of their opposing faces that are to mate with each other to adjustably mount said movable part to said member to move transverse to the length of said body open section; and
a template on said platform having a cutout pattern of one of a mortise or tenon overlying the platform open section to guide a router bit to cut the mortise or tenon in the workpiece part.

13. The combination mortise and tenon jig as claimed in claim 12 wherein said ledge has through slots transverse to its length spaced apart, and further comprising a fastener passing through each said slot into said first part member to fasten said second clamp leg movable part to said runner.

14. The combination mortise and tenon jig as claimed in claim 12 further comprising a pair of arms pivotally mounted to said body below said platform along the length of said open section to be positioned across the width of said platform open section and to be engaged by the workpiece part.

15. The combination mortise and tenon jig as claimed in claim 12 wherein said jig body, first clamp leg and said second clamp leg runner comprise a unitary extrusion.

16. The combination mortise and tenon jig as claimed in claim 12 wherein said template is of two pieces and one of said pieces can be selectively positioned on said platform relative to the other of said pieces to adjust the length of the mortise or tenon.

17. The combination mortise and tenon jig as claimed in claim 12 further comprising registration marks on said platform at the center of at least one of the length and width of said open section.

18. The combination mortise and tenon jig as claimed in claim 12 wherein the serrations on said second clamp leg member face and on said ledge are parallel to a length edge of said template.

\* \* \* \* \*